United States Patent
Kim et al.

(10) Patent No.: US 9,461,694 B2
(45) Date of Patent: Oct. 4, 2016

(54) METHOD FOR CONTROLLING CONTROLLER AREA NETWORK TRANSCEIVER CIRCUIT AND DEVICE THEREFOR

(71) Applicants: HYUNDAI MOTOR COMPANY, Seoul (KR); KIA MOTORS CORPORATION, Seoul (KR)

(72) Inventors: Jin Kim, Suwon-si (KR); June Kyu Park, Hwaseong-si (KR); Soon-Myung Kwon, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/829,427

(22) Filed: Aug. 18, 2015

(65) Prior Publication Data

US 2016/0204818 A1    Jul. 14, 2016

(30) Foreign Application Priority Data

Jan. 13, 2015    (KR) .......................... 10-2015-0005964

(51) Int. Cl.
| | | |
|---|---|---|
| *H04L 5/16* | (2006.01) | |
| *H04B 1/40* | (2015.01) | |
| *H04B 1/3822* | (2015.01) | |
| *H04L 12/40* | (2006.01) | |

(52) U.S. Cl.
CPC .............. *H04B 1/40* (2013.01); *H04B 1/3822* (2013.01); *H04L 2012/40267* (2013.01)

(58) Field of Classification Search
CPC .............. H04L 2012/40215; H04L 27/2601; H04B 1/40; H04B 3/23; H04B 10/278; G06F 13/403; G06F 14/4282

USPC ..................... 375/219, 295; 710/106; 701/45
See application file for complete search history.

(56) References Cited

U.S. PATENT DOCUMENTS

| | | | |
|---|---|---|---|
| 2005/0179582 A1* | 8/2005 | Woodington | B60K 31/0008 342/70 |
| 2008/0119991 A1* | 5/2008 | Hattori | B60R 21/017 701/45 |
| 2011/0293036 A1* | 12/2011 | Ishimaru | H04L 25/028 375/295 |
| 2012/0293230 A1 | 11/2012 | Mori et al. | |

FOREIGN PATENT DOCUMENTS

| | | |
|---|---|---|
| JP | 2011-035449 A | 2/2011 |
| JP | 4937889 B2 | 5/2012 |

(Continued)

OTHER PUBLICATIONS

Office Action Korean Patent Application No. 119980045675 dated Nov. 9, 2015.

*Primary Examiner* — Khai Tran
(74) *Attorney, Agent, or Firm* — McDermott Will & Emery LLP

(57) ABSTRACT

A controller area network (CAN) circuit includes a first switch section circuit, a second switch section circuit, a reception section circuit, a transmission section circuit, a power supply circuit, a CAN-low (CANL) line and a CAN-high (CANH) line. The first switch section circuit is connected between the power supply circuit and the transmission section circuit and the second switch section circuit is connected between the power supply circuit and the reception section circuit.

17 Claims, 6 Drawing Sheets

(56) References Cited

FOREIGN PATENT DOCUMENTS

| JP | 5098429 B2 | 12/2012 |
| JP | 2013-175915 A | 9/2013 |
| JP | 2014-110599 A | 6/2014 |
| KR | 10-2012-0018648 A | 3/2012 |
| KR | 10-2013-0121114 A | 11/2013 |
| KR | 10-2014-0094674 A | 7/2014 |

* cited by examiner

FIG. 2
Prior Art
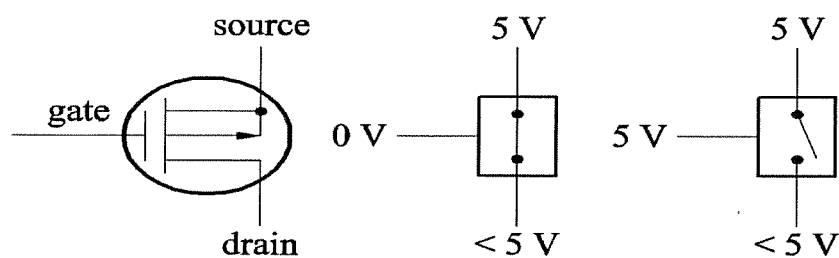
P-Channel MOSFET
(a)
Prior Art
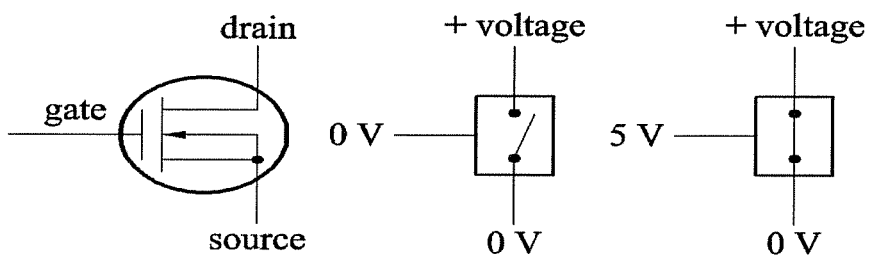
N-Channel MOSFET
(b)

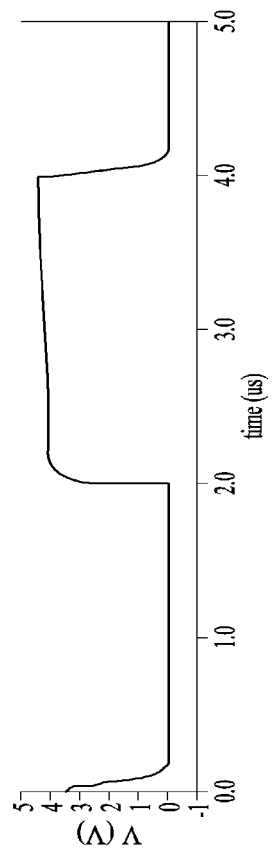
FIG. 4A PchDMOS Vg
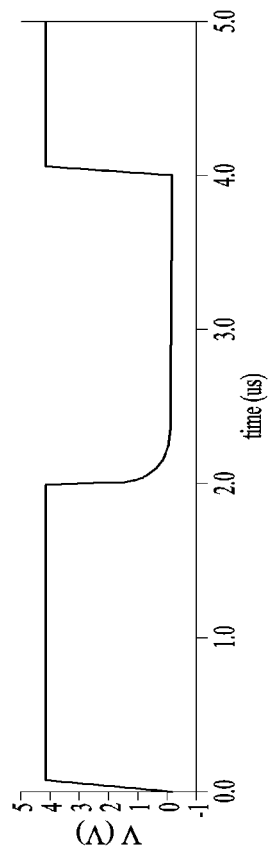
FIG. 4B NchDMOS Vgs
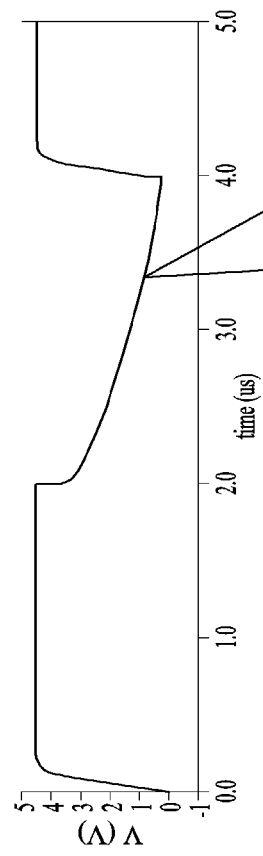
FIG. 4C PchDMOS Vgs

METHOD FOR CONTROLLING CONTROLLER AREA NETWORK TRANSCEIVER CIRCUIT AND DEVICE THEREFOR

CROSS-REFERENCE TO RELATED APPLICATION

This application claims priority to and the benefit of Korean Patent Application No. 10-2015-0005964, filed on Jan. 13, 2015 in the Korean Intellectual Property Office, which is hereby incorporated by reference as if fully set forth herein.

TECHNICAL FIELD

The present disclosure relates to a controller area network (CAN) transceiver circuit, and more particularly, to a method for controlling a CAN transceiver circuit and a device therefor.

BACKGROUND

A controller area network (CAN) protocol configuring a backbone network of a vehicle network is implemented by a CAN controller and a CAN transceiver.

Referring to FIG. 1, the CAN protocol includes a CAN controller 120 and a CAN transceiver 130. In addition, the CAN protocol is connected to a microcomputer (hereinafter, referred to as an MCU) 110. The CAN controller 120 has an internal buffer and determines whether a message received from the CAN transceiver 130 is valid and sends the message to the MCU 110. The CAN controller 120 sends data from the MCU 110 to the CAN transceiver 130.

The CAN transceiver 130 converts transmission/reception data received from a CAN bus or the MCU 110 into an electrical signal. The CAN transceiver 130 converts data received from the MCU 110 into data for CAN communication and converts data for CAN communication received from the CAN bus into data to be transmitted to the MCU 110.

The CAN transceiver 130 may have functions equal or similar to a general transceiver used for a vehicle. The CAN transceiver 130 operates in a power-on standby state, a standby state, a normal state, a doze state or a sleep state, which may be changed under control of the MCU 110.

The CAN transceiver 130 generates a CANH/CANL signal using two FETs. The two FETs include one P channel type MOSFET as shown in FIG. 2A and one N channel type MOSFET as shown in FIG. 2B.

The P-type element shown in FIG. 2A has low FET speed but the price of a driver thereof is cheap. In addition, the P-type element does not require a booster circuit and is implemented with ease. The N-type element shown in FIG. 2B has high FET speed but the price of a driver thereof is expensive. In addition, the N-type element requires a booster circuit and ease of implementation thereof is reduced.

Due to different ON/OFF speeds of the P-type element and the N-type element, the ON/OFF waveforms of CANH and CANL lines may be different. Therefore, it is not possible to accurately configure a bit time.

SUMMARY OF THE INVENTION

Accordingly, the present invention is directed to a method for controlling a CAN transceiver circuit and a device therefor that substantially obviate one or more problems due to limitations and disadvantages of the related art.

An object of the present invention is to provide a circuit for implementing an efficient CAN protocol and a method for controlling the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a controller area network (CAN) transceiver circuit includes a first switch section circuit, a second switch section circuit, a reception section circuit, a transmission section circuit, a power supply circuit, a CAN-low (CANL) line and a CAN-high (CANH) line. The first switch section circuit is connected between the power supply circuit and the transmission section circuit and the second switch section circuit is connected between the power supply circuit and the reception section circuit. The power supply circuit transmits logic data for controlling a waveform of an output of each of the switch section circuits to the first switch section circuit and the second switch section circuit. A message transmitted via the CANL line and the CANH line is expressed as a dominant level (high level) or a recessive level (low level) based on a predetermined voltage difference between the CANL line and the CANH line.

The first switch section circuit may include n first switching circuits and the second switch section circuit may include m second switching circuits. Each of the first switching circuits included in the first switch section circuit may include at least one resistor and at least one P channel type MOSFET. A source of the P channel type MOSFET may be connected to the at least one resistor in series. A drain of the P channel type MOSFET may be connected to a gate of a transistor configuring a driver circuit of the transmission section circuit. The transistor configuring the driver circuit may be a P channel type MOSFET. n may be equal to or greater than 2.

The first switch section circuit may be connected to a driver including an N channel type MOSFET in series. A source of the N channel type MOSFET may be connected to ground.

Each of the second switching circuits included in the second switch section circuit may include at least one resistor and at least one N channel type MOSFET. A drain of the N channel type MOSFET may be connected to the at least one resistor in series. The resistor connected to the drain of the N channel type MOSFET may be connected to a gate of a transistor configuring a driver circuit of the reception section circuit. A source of the N channel type MOSFET may be connected to ground. The transistor configuring the driver circuit may be an N channel type MOSFET. m is equal to or greater than 2.

A driver circuit of the transmission section circuit may be connected to a CAN-high (CANH) terminal and a driver circuit of the reception section circuit may be connected to a CAN-low (CANL) terminal.

In another aspect of the present invention, a method for controlling a controller area network (CAN) transceiver circuit in a microcomputer (MCU) includes transmitting a signal to the CAN transceiver circuit and transmitting logic data for a first switch section circuit and a second switch section circuit based on a terminating resistor value. Impedance of the first switch section circuit and impedance of the second switch section circuit are determined based on the logic data.

The first switch section circuit and the second switch section circuit may be controlled such that waveforms of bus lines (CAN-high (CANH) and CAN-low (CANL)) become equal, based on the logic data.

An output signal of the first switch section circuit may be input to a first transmission section circuit and output via a CAN-high (CANH) terminal and an output signal of the second switch section circuit may be input to a second transmission section circuit and output via a CAN-low (CANL) terminal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A and 2B are diagrams illustrating FET terminals used in an embodiment of the present invention;

FIGS. 4A-4C are diagrams illustrating properties of a FET terminal;

DETAILED DESCRIPTION OF THE INVENTION

The following embodiments are proposed by combining constituent components and characteristics of the present invention according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the present specification, a singular representation may include a plural representation unless context clearly indicates otherwise. It will be understood that the terms 'comprising', 'comprise', etc., when used in this specification, specify the presence of several components or several steps and part of the components or steps may not be included or additional components or steps may further be included. Hereinafter, embodiments of the method and device according to the present invention will be described. Although detailed examples are used to describe the embodiments, the present invention is not limited thereto.

The present invention relates to a communication system of a vehicle and, more particularly, to a communication system using a controller area network (CAN) as communication protocol.

Figure 1:
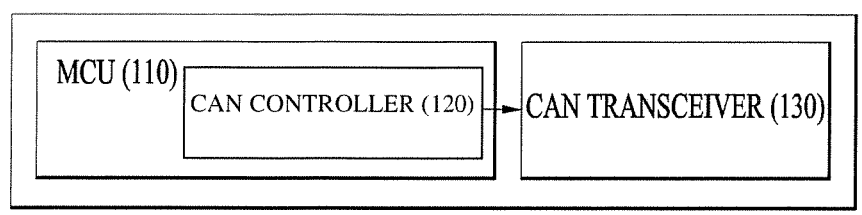
FIG. 1 is a diagram showing a simple implementation example of a CAN protocol.
Figure 3:
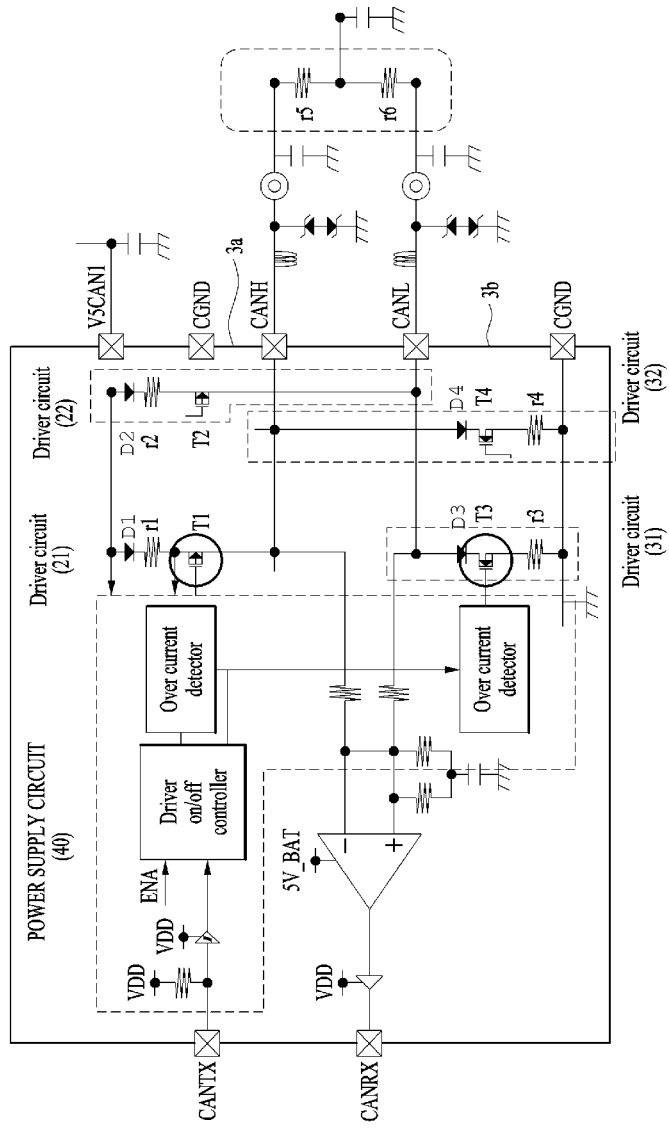
FIG. 3 is a block diagram showing a CAN internal circuit according to an embodiment of the present invention.

FIG. 3 is a block diagram showing a CAN internal circuit according to an embodiment of the present invention. The circuit includes general terminals for conventional transceivers, e.g., terminals CANH and CANL for connection to a communication bus (or a CAN bus), terminals CANRx and CANTx for receiving logic data from a communication controller and transmitting logic data to the communication controller, a terminal V5CAN1 for supplying a voltage and a terminal CGND for providing grounding. The circuit may further include an activation input terminal ENA according to the related art. Some terminals may be omitted for simplification.

The CAN circuit generates output signals for bus terminals CANH and CANL based on a transmission signal input to a transmission terminal CANTx of the communication controller. In addition, the CAN circuit generates a reception signal transmitted to the reception terminal CANRx for the communication controller based on at least a difference between the input signals of the bus terminals CANH and CANL.

The transceivers are all connected to the CANL line and the CANH line. The line connected to CANH is 3a and the line connected to CANL is 3b. The transmission lines terminate at terminating resistors r5 and r6. The transmission lines 3a and 3b transmit signals having different levels (low level and high level) based on a difference between CANH and CANL.

The CAN transceiver 130 includes driver circuits 21, 22, 31 and 32 and a power supply circuit 40. The driver circuits 21 and 22 configure a transmission section circuit (not shown) and the transmission section circuit converts data received via the CANTx terminal into a differential signal and outputs the differential signal to the CANH terminal and the CANL terminal. The driver circuit 31 and 32 configures a reception section circuit (not shown) and the reception section circuit demodulates the differential signal received via the CANH terminal and the CANL terminal into a data signal and transmits the data signal to the CANRx terminal.

Each of the driver circuits 21, 22, 31 and 32 includes a resistor, a transistor and a diode. A gate of a transistor T1 of the first driver circuit 21 is connected to the power supply circuit 40, a drain thereof is connected to the CANH terminal and a source thereof is connected to a resistor r1. The other end of the resistor r1 is connected to a cathode of a diode D1.

A gate of a transistor T3 of the third driver circuit 31 is connected to the power supply circuit 40, a drain thereof is connected to a cathode of a diode D4, and a source thereof is connected to a resistor r3. An anode of the diode D4 is connected to the CANL terminal. The other end of the resistor 33 is connected to ground.

The transmitter of the CAN transceiver converts a transmission signal transmitted at CANTx in to a communication signal (differential signal) and transmits the communication signal to CANL and CANH. More specifically, if the transmission signal is at a low level, the transmission signal is converted into a differential signal in a recessive state by generating a voltage difference between terminating resistors. In contrast, if the transmission signal is at a high level, the transmission signal is converted into a signal in a dominant state by generating a voltage difference between the terminating resistors. Hereinafter, the term "dominant" means that a difference between CANH and CANL is greater than or equal to a specific threshold and the term "recessive" means that the difference between CANH and CANL is less than the specific threshold.

More specifically, the communication controller 120 transmits the communication signal of the recessive level (low level) to the bus and transmits the communication signal of the dominant level (high level) to the bus.

The power supply circuit 40 outputs a high-level signal as a drive signal input to the transistor T1 and outputs a low-level signal as a drive signal input to the transistor T3, while the transmission signal received from the controller 120 is at the low level. In this state, the transistors T1 and T3 are turned off. Accordingly, the differential voltage at the CANL line and the CANH line are at the low level, that is, in the recessive state which is equal or close to 0.

In contrast, when the transmission signal received from the controller 120 is at a high level (in a dominant state), the power supply circuit 40 outputs the drive signal of the low level to the transistor T1. In addition, the power supply circuit 40 inputs the high-level signal to the transistor T3. When the transistors T1 and T3 are turned on, the differential voltage between the CANL line and the CANH line are at a high level (in a dominant state).

Referring to FIG. 3, the CANH line is composed of a P-ch DMOSFET and the CANH line is composed of an N-ch DMOSFET. FIGS. 4A-4C show waveforms of MOSFETs for a gate input waveform. According to the description of FIGS. 2A and 2B, when a gate voltage is applied to the N-ch DMOSFET, Nch Vgs (FIG. 4B) rapidly varies; in contrast, when a gate voltage Vg of FIG. 4A is applied to the P-ch DMOSFET, Pch Vgs (FIG. 4C) does not immediately vary. Accordingly, when the CAN transceiver 130 generates an output signal, the waveforms of the CANH line and the CANL line do not have ideal output curves. In order to solve this problem, since the configuration of an inductor and a capacitor is changed or a split capacitor is required, the configuration of a controller and a system may be changed according to semiconductor and thus development costs may increase. For example, additional configurations such as capacitors, inductors, etc., which are connected to the terminating resistors r5 and r6 of FIG. 3, may be necessary.

The present invention proposes a method for configuring and controlling a circuit so as to variably set impedance values of FETs of CANH and CANL lines in order to prevent communication delay due to semiconductor processing of a CAN transceiver 130 and a CAN bus system and minimize change and configuration of an external circuit.

Figure 5:
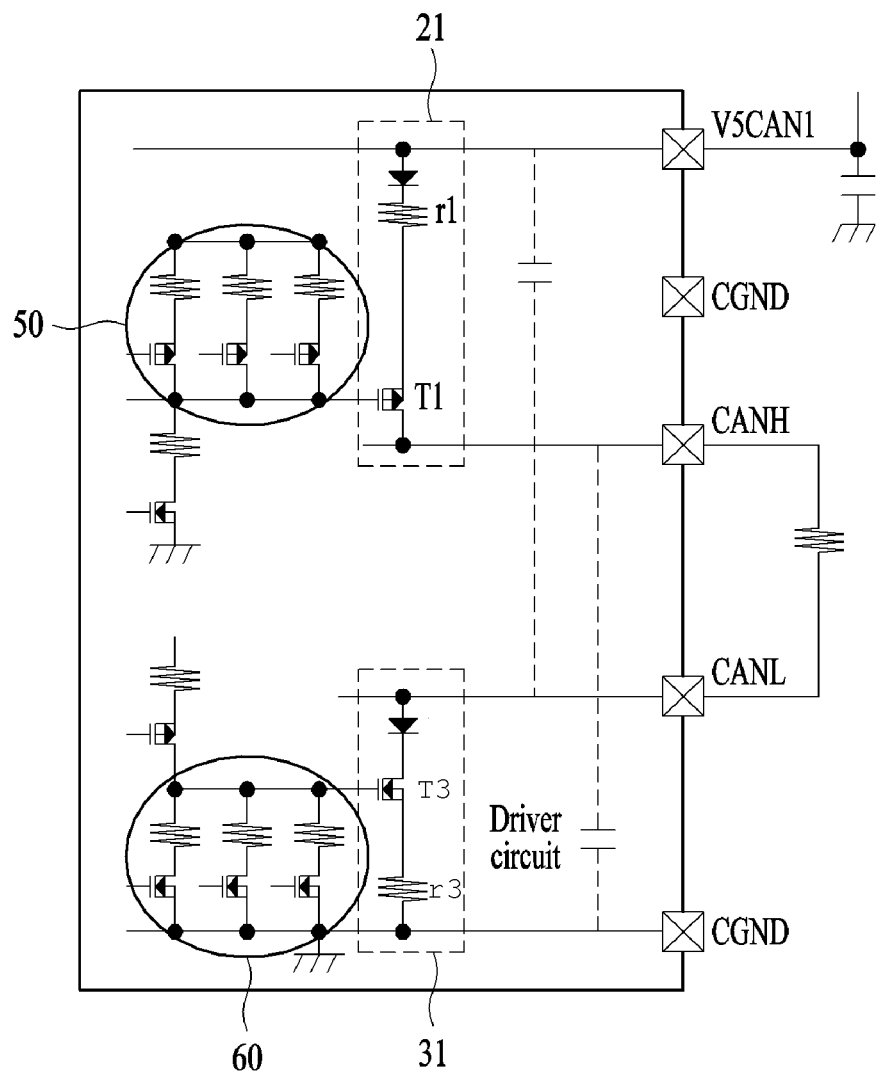
FIG. 5 is a block diagram showing a CAN internal circuit according to another embodiment of the present invention.

FIG. 5 is a block diagram showing a CAN circuit according to another embodiment of the present invention.

The present invention proposes a method for variably controlling an on/off time of FETs of a CANH line and a CANL line by adding a first switch section circuit 50 and/or a second switch section circuit 60.

The first switch section circuit 50 may include n first switch circuits. The second switch section circuit 60 may include M second switch circuits.

Each first switch circuit may be composed of a P-ch MOSFET and one resistor. A source of the P-ch MOSFET is connected to the resistor in series and a drain thereof may be connected to a gate of the transistor T1 of a first driver circuit 21. A gate of the P-ch MOSFET is connected to a power supply section circuit 40 to receive logic data from the CANTx terminal. The N first switch circuits may be connected in parallel in the first switch section circuit. n may be equal to or greater than 2, preferably, n=3. In addition, the resistors of the switch circuits may have the same value or different values.

The first switch section circuit 50 may be connected to one N-ch MOSFET and resistor. The N-ch MOSFET and the resistor may correspond to the driver circuit 22 shown in FIG. 3. A source of the N-ch MOSFET is connected to ground and a gate thereof is connected to the power supply section circuit 40 to receive logic data from the CANTx terminal. A drain of the N-ch MOSFET may be connected to the resistor and the other end of the resistor is connected to the first switch section circuit 50.

The logic data transmitted from the CAN controller 120 may be controlled to control operation of the N-ch MOSFET or P-ch MOSFET, thereby switching operation for controlling a bit time according to the related art and operation for controlling a bit time according to the present invention. The logic data may be controlled to control impedance according to the first switching section circuit. The logic data may be set in consideration of a terminating resistor value.

The second switch circuit may be composed of an N-ch MOSFET and one resistor. A source of the N-ch MOSFET may be connected to the resistor in series and a drain thereof may be connected to a gate of a transistor T3 of a third driver circuit 31. A gate of the second switch circuit may receive logic data from the CAN controller 120.

The m second switching circuits may be connected in parallel in the second switch section circuit. The second switch circuits included in the second switch section circuit are connected to ground. The gates of the P-ch MOSFET and/or the N-ch MOSFET of the first switch circuit and the second switch circuit may receive the transmission signal from the power supply section 10. The gates of the P-ch MOSFET and/or the N-ch MOSFET of the first switch circuit and the second switch circuit closest to the power supply section 10 may receive the transmission signal from the power supply section 10. m may be equal to or greater than 2, preferably, m=3. That is, the second switch section circuit may include three first switch circuits. In addition, the resistors of the second switch circuit may have the same value or different values.

The second switch section circuit 60 may be connected to one P-ch MOSFET and one resistor. The N-ch MOSFET and the resistor may correspond to the driver circuit 32 shown in FIG. 3. A source of the P-ch MOSFET is connected to ground, a gate thereof is connected to the power supply section circuit 40, and a drain thereof is connected to the resistor. The other end of the resistor is connected to the second switch section circuit 60.

The gate of each second switch circuit may receive logic data from the CAN controller 120. The on/off state of the switch may be controlled according to the value of the logic data. Accordingly, the gate may be controlled by controlling the logic data input to each gate. That is, for the second switch section circuit, eight impedance values may be controlled according to the logic data input to the gate.

Operation of the N-ch MOSFET or P-ch MOSFET may be controlled via the logic data transmitted from the CAN controller 120. The first switch section circuit is connected to the driver circuit including the N-ch MOSFET. Accordingly, it is possible to control impedance via the first switch section circuit using the logic data and to implement a conventional CAN transceiver circuit using only the driver circuit (e.g., the driver circuit 32) including the N-ch MOSFET. The second switch section circuit is connected to the driver circuit including the P-ch MOSFET. Accordingly, it is possible to control impedance via the first switch section circuit using the logic data and to implement a conventional CAN transceiver circuit using only the driver circuit (e.g., the driver circuit 22) including the P-ch MOSFET.

That is, operation of the related art and operation for controlling impedance according to the present invention may be switched. The logic data may be controlled to control the impedance according to the second switch section circuit 60. The logic data may be set in consideration of a terminating resistor value.

The on/off state of the switch may be set by controlling the logic data input to each switch circuit. The value of the switch may be controlled using 8 ($2^n$) (n=3) impedance values of the CANH/CANL line. As a result, it is possible to implement 16 properties.

The impedance value of the switch section may be controlled by the MCU 100. When the MCU 110 is booted up, the impedance values may be automatically set. The MCU 110 may control the impedance value in consideration of the terminating resistor value. The impedance value may be set by controlling operation of the N-ch MOSFET and the P-ch MOSFET through transmission of the logic data.

According to the above-described configuration, the transceiver circuit can variably control a bit time in consideration of a terminating resistor value via a switch circuit without adding an external configuration (e.g., a capacitor, an inductor, etc.).

Figure 6:
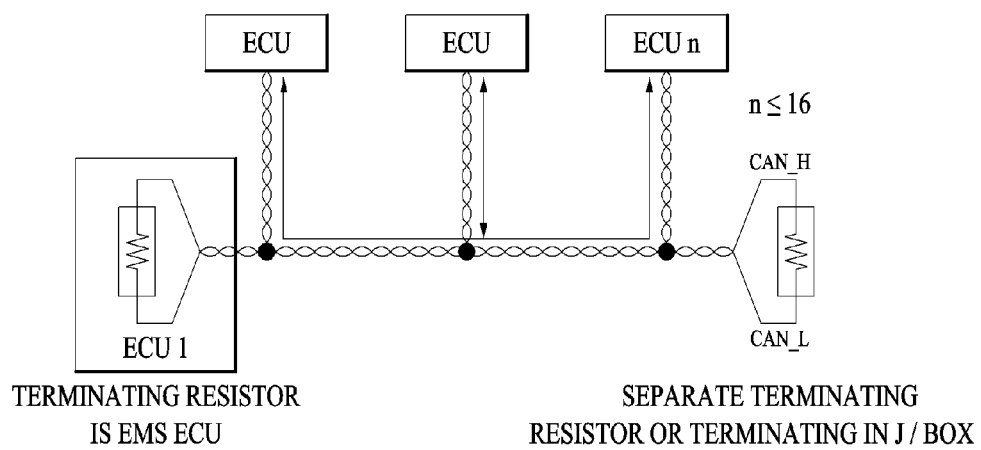
FIG. 6 is a diagram showing a CAN network including a plurality of electronic control units (ECU).

FIG. 6 is a diagram showing a CAN network including a plurality of electronic control units (ECUs). Each ECU is connected to a CAN bus.

Referring to FIG. 6, the CAN network includes n ECUs (n being equal to or less than 16) and a node of each ECU is connected to a CAN bus. Each ECU includes an MCU 110 connected via a CAN protocol. The MCU 110 may include a CAN controller 120 and a CAN transceiver 130. A differential signal converted into an electrical signal via the CAN transceiver is sent to the CAN bus. The CAN bus transmits or receives a signal to or from the CAN transceiver. The CAN bus includes a CANH line and a CANL line and includes a terminating resistor at an end thereof.

When the switching circuit according to the present invention is added to configure a CAN transceiver circuit, the ECU may control impedance using the switching circuit using a terminating resistor value. As a result, it is possible to ideally implement an output via a CANH line and a CANL line without adding an external component.

When the switching circuit according to the present invention is added, it is possible to reduce development costs, to reduce a development time and to improve quality, as compared to a conventional CAN circuit structure. Accordingly, the controller may not be changed according to semiconductor process and network state. Further, the number of parts of a passive element mounted outside the CAN transceiver can be minimized, thereby achieving cost reduction.

According to the present invention, it is possible to prevent communication delay due to properties of a P type element and an N type element and to efficiently control a CAN circuit.

Therefore, it is possible to reduce development costs, to reduce a development time and to improve quality, as compared to a conventional circuit.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A controller area network (CAN) transceiver circuit comprising a first switch section circuit, a second switch section circuit, a reception section circuit, a transmission section circuit, a power supply circuit, a CAN-low (CANL) line and a CAN-high (CANH) line, wherein:
    the first switch section circuit is connected between the power supply circuit and the transmission section circuit and the second switch section circuit is connected between the power supply circuit and the reception section circuit,
    the power supply circuit transmits logic data for controlling a waveform of an output of each of the switch section circuits to the first switch section circuit and the second switch section circuit,
    a message transmitted via the CANL line and the CANH line is expressed as a dominant level (high level) or a recessive level (low level) based on a predetermined voltage difference between the CANL line and the CANH line,
    the first switch section circuit includes n first switching circuits and the second switch section circuit includes m second switching circuits, and
    n is equal to or greater than 2.

2. The CAN transceiver circuit according to claim 1, wherein each of the first switching circuits included in the first switch section circuit includes at least one resistor and at least one P channel type MOSFET.

3. The CAN transceiver circuit according to claim 2, wherein a source of the at least one P channel type MOSFET is connected to the at least one resistor in series.

4. The CAN transceiver circuit according to claim 3, wherein a drain of the at least one P channel type MOSFET is connected to a gate of a transistor configuring a first driver circuit of the transmission section circuit.

5. The CAN transceiver circuit according to claim 4, wherein the transistor configuring the first driver circuit of the transmission section circuit is a P channel type MOSFET.

6. The CAN transceiver circuit according to claim 1, wherein each of the second switching circuits included in the second switch section circuit includes at least one resistor and at least one N channel type MOSFET.

7. The CAN transceiver circuit according to claim 6, wherein a drain of the at least one N channel type MOSFET is connected to the at least one resistor in series.

8. The CAN transceiver circuit according to claim 7, wherein the resistor connected to the drain of the at least one N channel type MOSFET is connected to a gate of a transistor configuring a third driver circuit of the reception section circuit.

9. The CAN transceiver circuit according to claim 8, wherein a source of the at least one N channel type MOSFET is connected to ground.

10. The CAN transceiver circuit according to claim 8, wherein the transistor configuring the third driver circuit of the reception section circuit is an N channel type MOSFET.

11. The CAN transceiver circuit according to claim 8, wherein a driver circuit of the reception section circuit is connected to a CAN-low (CANL) terminal.

12. The CAN transceiver circuit according to claim 1, wherein m is equal to or greater than 2.

13. The CAN transceiver circuit according to claim 1, wherein the second switch section circuit is connected to a fourth driver circuit including a P channel type MOSFET in series.

14. The CAN transceiver circuit according to claim 1, wherein:
the first switch section circuit is connected to a second driver including an N channel type MOSFET in series,
the second driver circuit includes the N channel type MOSFET and one resistor, and
a source of the N channel type MOSFET is connected to ground.

15. A method for controlling a controller area network (CAN) transceiver circuit in a microcomputer (MCU), the method comprising:
transmitting a signal to the CAN transceiver circuit; and
transmitting logic data for a first switch section circuit and a second switch section circuit based on a terminating resistor value,
wherein impedance of the first switch section circuit and impedance of the second switch section circuit are determined based on the logic data,
the first switch section circuit includes n first switching circuits and the second switch section circuit includes m second switching circuits, and
n is equal to or greater than 2.

16. The method according to claim 15, wherein the first switch section circuit and the second switch section circuit are controlled such that waveforms of bus lines (CAN-high (CANH) and CAN-low (CANL)) become equal, based on the logic data.

17. The method according to claim 16, wherein an output signal of the first switch section circuit is input to a first transmission section circuit and is output via a CAN-high (CANH) terminal, and an output signal of the second switch section circuit is input to a second transmission section circuit and is output via a CAN-low (CANL) terminal.

* * * * *